US008537985B2

(12) United States Patent
Reddy et al.

(10) Patent No.: US 8,537,985 B2
(45) Date of Patent: *Sep. 17, 2013

(54) MOBILE BUSINESS CLIENT

(75) Inventors: Srinivas Reddy, Bensheim (DE); Juergen Hagedorn, Nussloch (DE); Martin Botschek, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,197

(22) Filed: Nov. 29, 2011

(65) Prior Publication Data

US 2012/0072489 A1 Mar. 22, 2012

Related U.S. Application Data

(63) Continuation of application No. 11/784,105, filed on Apr. 4, 2007, now Pat. No. 8,102,975.

(51) Int. Cl.
*H04M 1/64* (2006.01)

(52) U.S. Cl.
USPC ......................... 379/88.17; 719/311; 370/354

(58) Field of Classification Search
USPC ............. 719/310, 311; 704/270; 379/88.17; 370/354
See application file for complete search history.

(56) References Cited

U.S. PATENT DOCUMENTS

| | | | |
|---|---|---|---|
| 5,915,001 | A | 6/1999 | Uppaluru |
| 7,046,771 | B2 | 5/2006 | Dalrymple |
| 7,203,907 | B2 | 4/2007 | Weng et al. |
| 7,206,388 | B2 | 4/2007 | Diacakis |
| 7,251,602 | B2 | 7/2007 | Ito et al. |
| 7,260,536 | B1 | 8/2007 | Abu-Samaha |
| 2008/0249781 | A1 | 10/2008 | Reddy et al. |

OTHER PUBLICATIONS

Besling, S.; Codini, M.; Doyle, S.; Elliston, D.; Gill, M.; Gilmore, J.; Kavaler, A.; Mann, J.; Wodtke, D. SAP NetWeaver Voice IDE (Dec. 2005) [ from http://www.voiceobjects.com/en/download/index.html ].*

VoiceObjects Whitepaper, The Case for VoiceXML IVRs and Phone Application Servers (Nov. 2006) [ from http://www.voiceobjects.com/files/response/vo_voicexml_and_pas_wp_en.pdf ].*

"U.S. Appl. No. 11/784,105 , Response filed Jul. 7, 2011 to Non Final Office Action mailed Apr. 7, 2011", 9 pgs.

"U.S. Appl. No. 11/784,105, Non Final Office Action mailed Apr. 7, 2011", 9 pgs.

"U.S. Appl. No. 11/784,105, Notice of Allowance mailed Oct. 6, 2011", 8 pgs.

"The Case for VoiceXML IVRs and Phone Application Servers", VoiceObjects Whitepaper, [retrieved from http://www.voiceobjects.com/files/response/vo_voicexml_and_pas_wp_en. pdf on May 4, 2010]., (Nov. 2006), 12 pgs.

(Continued)

*Primary Examiner* — Gerald Gauthier
*Assistant Examiner* — Simon King
(74) *Attorney, Agent, or Firm* — Schwegman Lundberg & Woessner, P.A.

(57) ABSTRACT

The subject matter herein relates to computer software and client-server based applications and, more particularly, to a mobile business client. Some embodiments include one or more device-agnostic application interaction models and one or more device specific transformation services. Some such embodiments provide one or more of systems, methods, and software embodied at least in part in a device specific transformation service to transform channel agnostic application interaction models to and from device or device surrogate specific formats.

17 Claims, 3 Drawing Sheets

(56) References Cited

OTHER PUBLICATIONS

Besling, Codini S., et al., "SAP NetWeaver Voice IDE", [retrieved from http://www.voiceobjects.com/en/download/index.html on May 3, 2010]., (Dec 2005), 27 pgs.

Chugh, J., et al., "Voice-Enabling Enterprise Applications.", Proceedings of the Eleventh IEEE International Workshps on Enabling Technologies: Infrastructure for Collaborative Enterprises., WETICE'02 (2002). [retrieved from http://ieeexplore.ieee.org on May 4, 2010]., (2002), 2 pgs.

Rouillard, et al., "Web Services and Speech-Based Applications around VoiceXML.", Journal of Networks, vol. 2, No. 1, [retrieved from http://ieeexplore.ieee.org on May 04, 2010]., (Feb. 2007), 9 pgs.

* cited by examiner

MOBILE BUSINESS CLIENT

RELATED APPLICATION

This application is a continuation of U.S. patent application Ser. No. 11/784,105 filed on Apr. 4, 2007 now U.S. Pat. No. 8,102,975, which is entitled "VOICE BUSINESS CLIENT," the benefit of priority of which is claimed hereby, and which is incorporated herein by reference in its entirety.

TECHNICAL FIELD

The subject mater herein relates to computer software and client-server based applications and, more particularly, to a voice business client.

BACKGROUND INFORMATION

Networked computer software applications today can be delivered to users in many different ways on many different device types. Such applications can be delivered over wired and wireless networks and even over voice networks through interactive voice response systems. The devices can include personal computers, personal digital assistants (PDA), mobile telephones, hybrid telephone/PDAs, and other devices.

Development of a networked computer application for delivery over a certain type of network to a particular device type typically requires customized development. For example, if the application is to be delivered over a voice network, a custom voice application needs to be developed. If the application is to be delivered over a wireless network to a mobile telephone or hybrid telephone/PDA device, such as a Blackberry, the application needs to be customized for the particular Blackberry device. Such device and network customization of computer software applications results in duplicated efforts and multiple codesets that provide essentially the same functionality, just through a different delivery mechanism. The result is an interwoven web of essentially redundant applications that are expensive to develop, maintain, and track.

DETAILED DESCRIPTION

Various embodiments described herein provide systems, methods, and software that consume application interaction models, transform those models in response to a client request into a format that may be processed by the requesting client, and communicate the transformed application interaction model to the requesting client. In some such embodiments, as will be further described below, an application may be modeled once, but be consumable by multiple different client types through the use of transformation clients. In some embodiments, a transformation client transforms a client and network agnostic application interaction model to a format of a specific client type. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
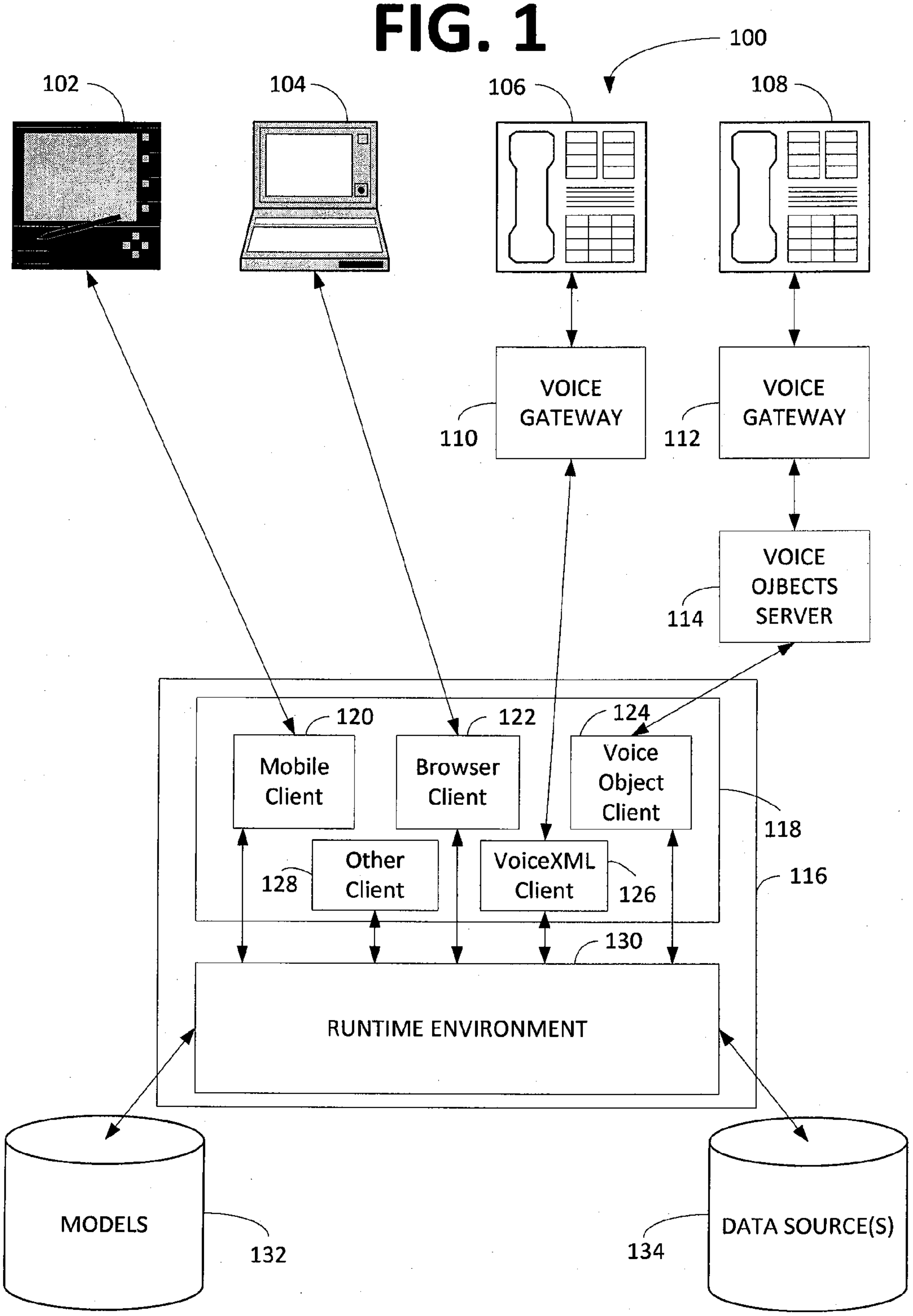
FIG. 1 is a logical block diagram of a system according to an example embodiment.

FIG. 1 is a logical block diagram of a system 100 according to an example embodiment. The system 100 may include multiple clients 102, 104, 106, 108 that may be of varied client types. In some embodiments, the client types may include a personal digital assistant ("PDA") 102, a personal computer 104, a telephone 106, 108, or other device types.

The system 100 allows the clients 102, 104, 106, 108 to execute, or otherwise interact with, an application that exists as an interaction model in a model repository 132 and executes in an application runtime environment 130 using, and against, data and processes located in one or more data sources 134 or other applications and processes. In some embodiments, the application runtime environment 130 executes on an application server 116. The application runtime environment 130, in typical embodiments, includes processes that retrieve application interaction models from the model repository 132, evaluate a retrieved model to identify data or other processes referenced by the retrieved model, retrieve the referenced data and call the referenced processes, and provide the model and data to a requesting transformation service client 120, 122, 124, 126, 128.

In some embodiments, the runtime environment 130 communicates with the transformation service clients 120, 122, 124, 126, 128 in client-agnositc messages encoded according to a markup-language standard. In some embodiments, the markup language is eXtensible Markup Language ("XML"), or a derivative thereof. In some embodiments, the XML derivative is Small Client XML or State Chart XML.

The transformation service clients 120, 122, 124, 126, 128 makeup a group of transformation services 118. Each transformation service client 120, 122, 124, 126, 128 is targeted toward servicing application interactions from certain client types. For example, there may be transformation service clients for mobile clients 120 such as mobile telephone web browsers, browser clients 122 such as personal computer web browsers, VoiceObject clients 124 to interact with and provide interactive voice response application services to a VoiceObjects server 114 available from VoiceObjects of San Mateo, Calif. The transformation services may also include transformation service clients for voiceXML clients 126 to interact with a voiceXML enabled voice gateway 110 and other clients 128 to interact with gateways or directly with clients of various other types.

In some embodiments, the transformation service clients 120, 122, 124, 126, 128 are operative to receive an application interaction request, directly or indirectly, from a requestor, such as one or more of the clients 102, 104, 106, 108, in a format of the client, transform that request into a client-agnostic format, such as SCXML, and communicate that request to the runtime environment 130. The runtime environment 130 then processes that request by retrieving an application interaction model from the model repository 132. The runtime environment 130 further processes the retrieved model to call any referenced methods or services within the model and to retrieve any referenced data. The retrieved model is then rendered into the client-agnostic format and communicated to the requesting transformation service client.

In some such embodiments, the transformation service client then applies transformation rules to the rendered model to transform the rendered model into a client specific format. In some embodiments, the client specific format includes one or more of hypertext markup language ("HTML"), one or more browser-executable scripting languages, XML, VoiceXML, VoiceObjectsXML, or other format depending on the specific client type or client surrogate.

A client surrogate may include a gateway, such as a voice gateway 110, 112 that further processes the client specific formatted data, such as by executing the client specific formatted data as a voice application provided to an end-client, such as a wired or wireless telephone 106, 108. In some such embodiments, more than one client surrogate may exist between the end-client and the transformation service client. For example, a VoiceObjects server 114 may interact directly with the VoiceObject client 124 and also directly with the voice gateway 112 that handles connections to telephone calls into the VoiceObjects server 114.

In some embodiments, the application server 116 is a J2EE compliant application server. The application server 116 may execute on virtually any hardware platform, such as a Windows-based or a Unix-based hardware platform. The hardware platform on which the application server 116 executes typically includes a connection to one or more networks. The networks may include one or more of a local area network, a wide area network, a system area network, the Internet, or other local, regional, or global data network.

The data sources 134, in various embodiments, include one or more of a database management system, one or more objects offering services, modules, procedures, or other data processing or storage elements.

Models 132 include one or more applications modeled in a client and network agnostic format, sometimes referred to as a channel agnostic format. In some embodiments, the channel agnostic format is a markup-language derivative, such as XML. In other embodiments, the channel agnostic format may be a runtime-environment standard.

In some embodiments, the models may include components and subcomponents, such as modules. In some such embodiments, components and subcomponents may be included in one or more models. In some embodiments, a model may be a component or subcomponent. Thus, one model may be built using one or more pre-existing or new developed models.

As mentioned above, the runtime environment 130 and transformation service clients 120, 122, 124, 126, 128 execute on an application server 116. Although only a single application server 116 is illustrated, other embodiments include two or more application servers 116. The two or more application servers 116 may operate independently of each other in a manner to load balance application demand by clients 102, 104, 106, 108. In other embodiments, the transformation service clients 120, 122, 124, 126, 128 each may be deployed to one or more of the two or more application servers 116. In yet further embodiments, the two or more application servers 116 may include one or more of the processing portions of the system 100 including the runtime environment 130, the transformation services 118, one or more voice gateways 110, 112, client surrogates, or other portions of the system 100 depending on the specific embodiment.

Figure 2:
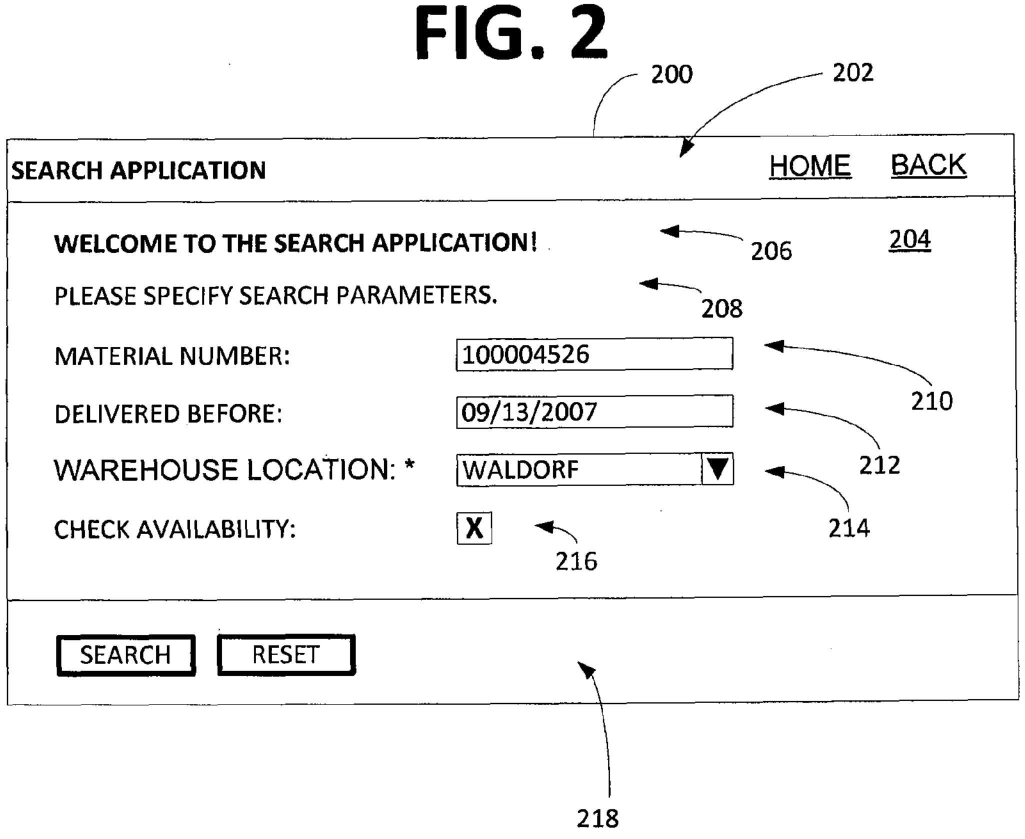
FIG. 2 is a user interface diagram according to an example embodiment.

FIG. 2 is a user interface 200 diagram according to an example embodiment. The user interface 200, in some embodiments, is modeled in a channel agnostic format, such as SCXML. In such an embodiment, a transformation service, such as a voice transformation service client, receives a request from a user, such as from user request received via a voice gateway. The voice transformation service receives a request for a voice application, or a portion thereof. The voice transformation service forwards that request to a runtime environment which retrieves the requested application, or portion thereof from a model repository. The runtime environment processes the retrieved model to piece together retrieved data and model portions and forwards the processed model to the voice transformation service client. The voice transformation service client then transforms the SCXML, or other format, of the model to a format of necessary to deliver the application of the model to the user. The following discussion of the user interface 200 includes a presentation of SCXML which is then transformed by an engine of a transformation service client, such as voice transformation service client (e.g., Voice Object Client 124 and VoiceXML client 126 of FIG. 1).

The user interface 200 is a graphical representation of a portion of an application. The user interface 200 is useful to perform a data search according to three specific parameters and a command to perform an additional action when providing search results. The user interface 200 is useful to visualize what is occurring when the model that will be described is transformed from the SCXML channel agnostic format to the voice client specific format.

First, the user interface 200 is better thought of as an interaction model. A model, as described herein, is a model of a means for interacting with the underlying application functionality. The model may be transformed into virtually any user interface, depending on the specific transformation service clients. Some such transformation service clients may include browser transformation service clients, voice transformation service clients, PDA transformation service clients, or transformation service clients for other devices.

The interaction model underlying the user interface 200 includes a header portion 202, a body 204, and an action portion 218. The header portion 202 includes a title of the application which may be transformed by some transformation service clients, such as a web browser transformation service client, while other transformation service clients may ignore the title, such as certain voice transformation service clients. The header portion 202 may also include global application interaction functionality, such as help availability, logon and logout functionality, forward and backward commands, and the like.

The body 204 and action portion 218 of the user interface 200 include various elements and controls. These elements and controls include a welcome message 206, an instruction message 208, three parameter input elements 210, 212, 214, and an input 216 which will cause additional output to be provided. The action portion 218 also provides action controls to submit the input into the user interface 200 back to the system.

In the present embodiment, the various elements and controls are provided to a voice transformation service client in SCXML. The voice transformation service client then transforms the SCXML into VoiceXML.

For example, the welcome message 206 is provided to the voice transformation service client as:

```
<TextView id=“DefaultTextView” design=“2” text=“Welcome to the
    search application!”>
```

The voice transformation service client identifies a pattern of this SCXML, such as by looking to metadata of the SCXML. The voice transformation service client identifies that the pattern is a text label. The voice transformation service client then uses a rule to transform the text label into an appropriate format for rendering by a voice gateway or other device or server. This results in a rendering such as:

```
<output>
    <outputItem>
        <text> Welcome to the search application!</text>
    </outputItem>
</output>
```

This example rendering can be understood by the voice gateway, or other device or server for delivering interactive voice response applications and used to generate a spoken rendition of the rendering.

The instruction message 208 would be processed in a similar manner.

The parameter input elements 210, 212, 214 each include two portions. These portions include a label and an input. The two are generally tied together to allow them to be more easily understood by the transformation services. An example of an SCXML interaction model transformed to VoiceXML is:

SCXML

```
<Label id="label" labelFor=“numberField" text=“Material
Number">
    <LayoutData><GridData
        paddingTop="15px"/></LayoutData>
</Label>
```

-continued

SCXML

```
<InputField id=“numberField" tooltip=“Material Number"
length="33" value.bind="DJNF.TestUIView.number">
    <LayoutData><GridData/></LayoutData>
</InputField>
```

VoiceXML

```
<input name=“numericField">
    <output type="initial">
        <outputItem>
            <text>input Material Number here</text>
        </outputItem>
    </output>
    <output type=“reprompt">
        <outputItem><text>Please Input Material Number in form of
            sequence of digits. You can use your keypad. You can skip
            this field by saying skip or press 0.</text>
        </outputItem>
    </output>
    <grammar>
        <grammarItem>
            <grammarDefinition mode="voice"
            grammarType="builtin"
                ttg="true">digits?minlength=5;maxlength=5</grammar
                Definition>
            <grammarDefinition mode="dtmf" grammarType="builtin"
                ttg="true">digits?minlength=5;maxlength=5</grammar
                Definition>
        </grammarItem>
    </grammar>
    <resultHandling>
        <item alias=“numericFieldAlias"/>
    </resultHandling>
    <eventHandling inheritance="true">
        <eventHandlingItem continuation=“return"
        eventType="noInput"
        occurrence="1" sendSNMPTrap="false">
            <output><outputItem><text>Sorry?</text></outputItem>
        </output>
        </eventHandlingItem>
        <eventHandlingItem continuation="reprompt"
        eventType="noInput"
        occurrence="2" sendSNMPTrap="false">
            <output><outputItem><text>Sorry, I still didn’t hear
                you.</text></outputItem></output>
        </eventHandlingItem>
        <eventHandlingItem continuation="return"
        eventType="noMatch" occurrence="1"
        sendSNMPTrap="false">
            <output><outputItem><text>Sorry?</text></outputItem>
            </output>
        </eventHandlingItem>
        <eventHandlingItem continuation="reprompt"
        eventType="noMatch" occurrence="2"
        sendSNMPTrap="false">
            <output><outputItem><text>Sorry, I still didn’t get
                that.</text></outputItem></output>
        </eventHandlingItem>
    </eventHandling>
</input>
```

Such transformations are performed according to transformation rules that are defined within the voice transformation service client. In some embodiments, the transformation rules include rule that identify key words or markup language tags that may be used to identify a start and an end of a particular pattern. Once the start and end of a pattern are identified, additional information can be identified and extracted from a particular model pattern.

Figure 3:
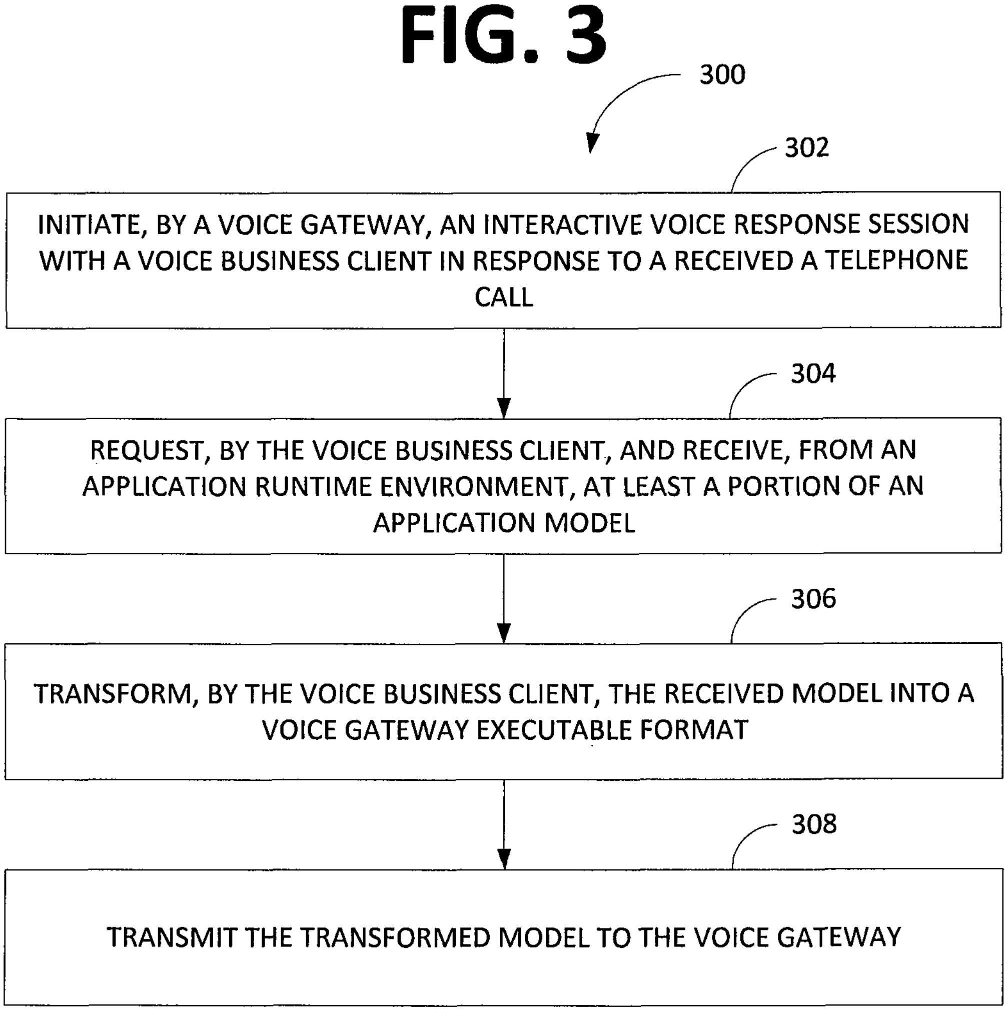
FIG. 3 is a block flow diagram of a method according to an example embodiment.

FIG. 3 is a block flow diagram of a method 300 according to an example embodiment. The example method 300 is a method of receiving and servicing telephone calls over a voice network, such as a public switched telephone network or voice over internet protocol network.

The example method 300, in some embodiments, includes receiving a phone call at a voice gateway and initiating 302, by the voice gateway, an interactive voice response session with a voice business client in response to a received a telephone call. The method 300 further includes requesting 304, by the voice business client, and receiving, from an application runtime environment, at least a portion of an application model and transforming 306, by the voice business client, the received model into a voice gateway executable format. The method 300 also includes transmitting 308 the transformed model to the voice gateway. The voice gateway, in some embodiments, includes a VoiceObjects enabled voice gateway.

In some embodiments of the method 300, the application runtime environment processes the request 304 for the at least a portion of the application model by retrieving the requested portion of the application model from storage and processing the retrieved application model portion to retrieve any additional data identified in the model from one or more data stores. Such embodiments further render the processed application model into a markup-language and communicate the rendered model to the voice business client.

In some embodiments, the transforming 306 of the received model into the voice gateway executable format of the method 300 includes evaluating the received model to identify one or more model patterns and selecting one or more transformation rules as a function of the one or more identified model patterns. Some such embodiments then continuing by applying the selected transformation rules to the respective model patterns, the result of which is voice gateway executable instructions. Transforming the received model into the voice gateway executable format may include selecting one or more global transformation rules of the application model and applying the one or more global transformation rules to cause one or more globally available functions to be included in the voice gateway executable instructions.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method of interacting with a mobile client device comprising;

initiating an interactive session with a mobile business client in response to a received communication from a mobile client device;

requesting, by the mobile business client, and receiving, from an application runtime environment, at least a portion of an application model;

transforming, by the mobile business client, the received model into a mobile client device executable format, the transforming including:

evaluating the received model to identify one or more model patterns;

selecting one or more transformation rules as a function of the one or more identified model patterns; and applying the selected transformation rules to the respective model patterns, the result of which is mobile client device executable instructions; and transmitting the transformed model to the mobile client device.

2. The method of claim 1, wherein the application runtime environment processes the request for the at least a portion of the application model by:

retrieving the requested portion of the application model from storage;

processing the retrieved application model portion to retrieve any additional data identified in the model from one or more data stores;

rendering the processed application model into a markup-language; and communicating the rendered model to the mobile business client.

3. The method of claim 1, wherein the application model is received by the mobile business client in a generic format; and the mobile business client transforms the generic format application model into a mobile client device specific format determined by the mobile business client as a function of the type of mobile client device that initiated the interactive session.

4. The method of claim 1, wherein transforming the received model into the mobile client device executable format further includes:

selecting one or more global transformation rules of the application model; and applying the one or more global transformation rules to cause one or more globally available functions to be included in the mobile client device executable instructions.

5. The method of claim 1, wherein the one or more model patterns includes an application control model.

6. The method of claim 1, wherein the mobile client device is a mobile telephone.

7. A non-transitory device-readable medium, with executable instructions, which when processed by one or more suitably configured devices, causes the one or more devices to service interactions with a mobile client device by:

initiating an interactive session with a mobile business client in response to a received communication from a mobile client device;

requesting, by the mobile business client, and receiving, from an application runtime environment, at least a portion of an application model;

transforming, by the mobile business client, the received model into a mobile client device executable format, the transforming including:

evaluating the received model to identify one or more model patterns;

selecting one or more transformation rules as a function of the one or more identified model patterns; and applying the selected transformation rules to the respective model patterns, the result of which is mobile client device executable instructions; and transmitting the transformed model to the mobile client device.

8. The non-transitory device-readable medium of claim 7, wherein the application runtime environment processes the request for the at least a portion of the application model by:

retrieving the requested portion of the application model from storage;

processing the retrieved application model portion to retrieve any additional data identified in the model from one or more data stores;

rendering the processed application model into a markup-language; and communicating the rendered model to the mobile business client.

9. The non-transitory device-readable medium of claim 7, wherein:

the application model is received by the mobile business client in a generic format; and the mobile business client transforms the generic format application model into a mobile client device specific format determined by the mobile business client as a function of the type of mobile client device that initiated the interactive session.

10. The non-transitory device-readable of claim 7, wherein transforming the received model into the mobile client device executable format further includes:

selecting one or more global transformation rules of the application model; and applying the one or more global transformation rules to cause one or more globally available functions to be included in the mobile client device executable instructions.

11. The non-transitory device-readable of claim 7, wherein the one or more model patterns includes an application control model.

12. The non-transitory device-readable of claim 7, wherein the mobile client device is a mobile telephone.

13. A system comprising:

an application server communicatively coupled to a network;

a runtime environment operative on the application server to:

retrieve one or more application models from an application model storage repository in response to a requesting object, and process the one or more application models by retrieving data associated with the application models from one or more locations and rendering the model and retrieved data to the requesting object in a descriptive text-based format; and one or more mobile client interface objects operative on the application server to:

receive an application request from a mobile client device and forward the request to the runtime environment, receive the rendering of the model and data from the runtime environment, transform the rendering into a format of the requesting mobile client device by:

evaluating the rendering to identify one or more patterns;

selecting one or more transformation rules as a function of the one or more identified patterns; and applying the selected transformation rules to the respective patterns, the result of which is the transformed rendering that includes mobile client device executable instructions, and dispatch the transformed rendering to the requesting mobile client device.

14. The system of claim 13, wherein the requesting object is the mobile client interface object.

15. The system of claim 13, comprising;

two or more mobile client interface objects.

16. The system of claim 13, wherein the mobile client interface objects transform model and data renderings into the mobile client device executable format further by;

selecting one or more global transformation rules of the one or more application model; and applying the one or more global transformation rules to cause one or more globally available functions to be included in the mobile client device executable instructions.

17. The system of claim 13, wherein the mobile client device is a mobile telephone.

* * * * *